June 22, 1937.  W. W. HUBENET  2,084,806
MANUFACTURE OF HAMS
Filed Sept. 5, 1933   2 Sheets-Sheet 1
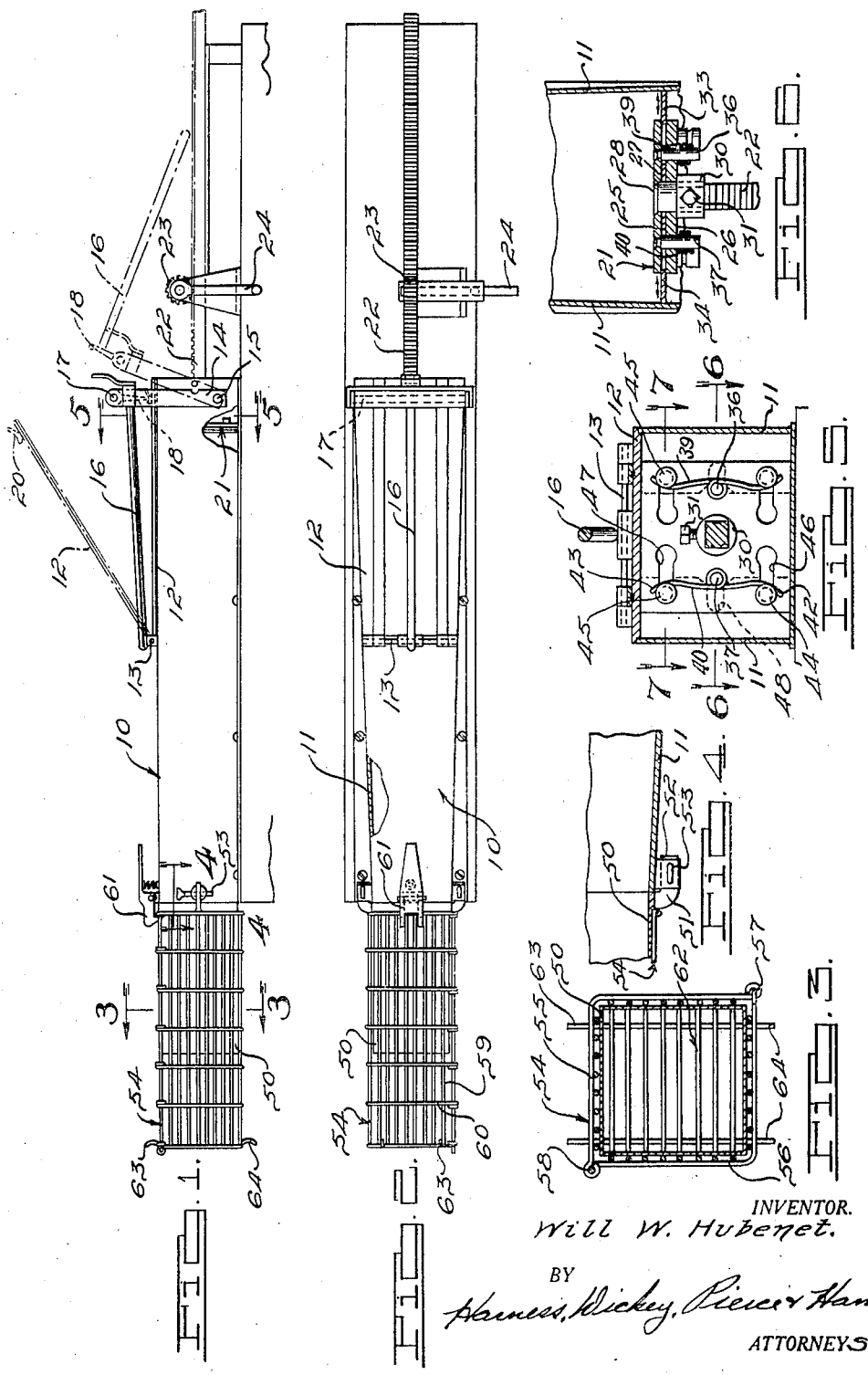
INVENTOR.
Will W. Hubenet.
BY
Harness, Dickey, Pierce & Hann.
ATTORNEYS.

June 22, 1937.  W. W. HUBENET  2,084,806
MANUFACTURE OF HAMS
Filed Sept. 5, 1933   2 Sheets-Sheet 2
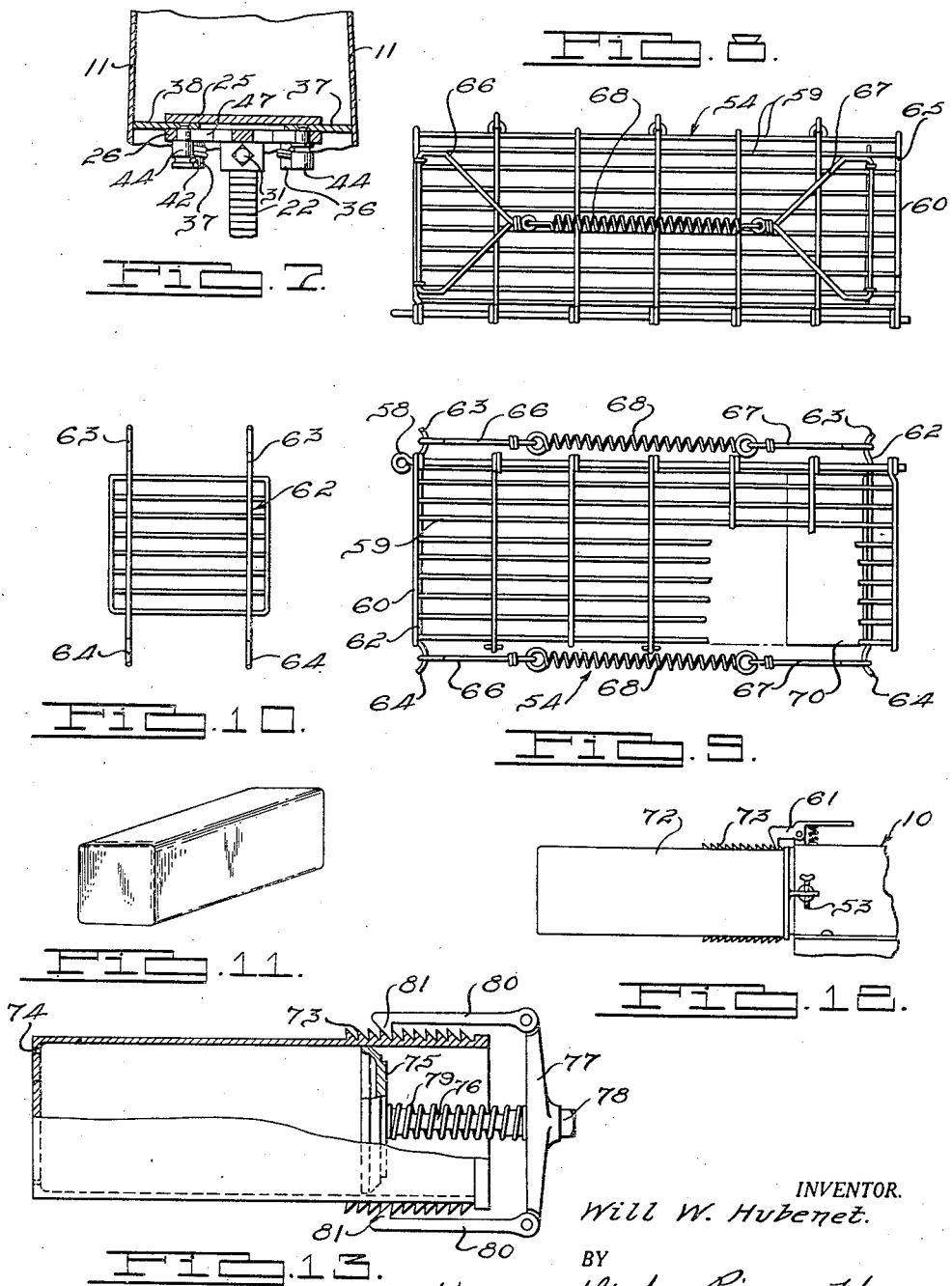
INVENTOR.
Will W. Hubenet.
BY
Harness, Dickey, Pierce & Hann.
ATTORNEYS.

Patented June 22, 1937

2,084,806

UNITED STATES PATENT OFFICE 2,084,806

MANUFACTURE OF HAMS

Will W. Hubenet, Detroit, Mich.

Application September 5, 1933, Serial No. 688,093

5 Claims. (Cl. 99—107)

The invention relates to the manufacture of hams, and it has particular relation to a process of and apparatus for manufacturing a ham which is substantially uniform in cross section throughout its length.

It is, of course, not new to produce a baked ham or a ham from which the bone has been removed, and at the present time baked ham may be found in various markets. So far as known, however, the truly baked ham from which the bone has been removed, is irregular or non-uniform in cross section and its form is somewhat retained by strings tied around it. In the truly baked article, it is essential that most of the moisture in the ham be evaporated without actually boiling the ham.

Boiled ham of elongated shape and substantially rectangular in cross section is produced at the present time, but the production of the truly baked ham of substantially uniform or cross section is more difficult owing to the baking process required in contrast to the boiling process.

One object of the invention is to produce a truly baked ham which is substantially uniform in cross section although varying in length, depending upon the size of the ham from which the article is to be manufactured.

Another object of the invention is to provide an apparatus for reducing a boned ham to an article of substantially uniform cross section although variable in length depending upon the size of the ham, and which may be baked while in an open mesh retainer into which the ham is moved during the manufacturing process.

Another object of the invention is to provide apparatus for producing a baked ham of the above character, in which the side walls of the ham will be retained in an open mesh construction and the end walls will be subjected to resilient pressure which has been found desirable in the baking process.

Another object of the invention is to provide a method of and apparatus for economically manufacturing either a boiled or baked ham substantially uniform in cross section although variable in length.

Other objects of the invention will be apparent from the accompanying drawings, the description relating thereto, and the claims hereinafter set forth.

For a better understanding of the invention, reference may be had to the drawings illustrating one form thereof, wherein:

Fig. 1 is a side elevational view of an apparatus constructed according to one form of the invention for manufacturing baked ham;

Fig. 2 is a plan view of the construction shown by Fig. 1, with certain parts broken away to illustrate details of the construction more clearly;

Fig. 3 is a cross-sectional view on a larger scale taken substantially along the line 3—3 of Fig. 1;

Fig. 4 is a cross-sectional view on a larger scale taken substantially along the line 4—4 of Fig. 1;

Fig. 5 is a cross-sectional view on a larger scale taken substantially along the line 5—5 of Fig. 1;

Fig. 6 is a cross-sectional view taken substantially along the line 6—6 of Fig. 5;

Fig. 7 is a cross-sectional view taken substantially along the line 7—7 of Fig. 5;

Fig. 8 is a plan view of a ham retaining basket used in the process of manufacturing the ham;

Fig. 9 is a side elevational view of the construction shown by Fig. 8 with the exception that a block is disposed in the basket for use particularly in the baking of smaller hams;

Fig. 10 is a detailed view illustrating one of the open mesh wire end walls for the basket;

Fig. 11 is a perspective view illustrating a baked ham as produced according to one form of the invention;

Figs. 12 and 13 illustrate a modified form of the invention, particularly adapted for manufacturing boiled ham.

Referring to Figs. 1, 2 and 5, a tubular member 10 is provided such as an elongated box, and as best shown by Fig. 2, two of the laterally opposed sides indicated at 11 gradually converge toward the left end of the box. At the larger end of the box, and at the upper side thereof, a cover 12 is provided which is pivotally mounted at its inner edge as indicated at 13. A yoke 14 pivotally secured to opposed side walls of the box as indicated at 15 is adapted to move over the end of the box and cover and a fastening bar 16 pivotally mounted in the yoke as indicated at 17, has a projection 18 adjacent the pivot for engaging a retaining member 20 mounted on the free edge of the cover. By raising the bar 16, the projection 18 moves out of the retaining element 20 and then the bar and yoke together may be moved to the position shown by broken lines and the cover may be raised. The cover is provided so that a boned ham may be inserted into the larger end of the box and then with the cover in its closed position, the box prevents the ham from being forced out of the entry opening.

For extruding the ham through the box from the larger end and through the smaller end thereof, a reciprocatory head 21 is provided which is fastened to a rack bar 22 projecting beyond the larger end of the box. A pinion 23 meshing with the teeth of the rack bar and which may be turned by a handle 24 serves to reciprocate the rack bar and hence the head 21. The head 21 is constructed of two plates 25 and 26 separated by a central plate 27 and the end of the rack bar extends centrally through such plates and is swaged over as indicated at 28 at the inner side of plate 25. A collar 30 is adjustably fastened by means of a set screw 31 to the rack bar against plate 26 thus holding the parts rigidly associated. Between plates 25 and 26 at opposite sides of plate 27, wings 33 and 34 are slidably mounted for movement in directions transversely of the head and it will be appreciated that this arrangement permits the free or outer edges of the wings to maintain contact with the converging side walls 11 of the box while still maintaining a solid head in effect. During movement of the head through the box and toward its smaller end, it will be necessary for the wings to move inwardly towards the center of the head and for normally urging the wings into contact with the side walls 11 of the box so as to maintain an efficient and tight contact, pins 36 and 37 project through and are secured to both plates 25 and 26 outwardly of plate 27, and such pins have projecting portions at the outer side of plate 26. Spring wires 39 and 40 are looped around the projecting portions of pins 36 and 37, and such wires have ends 42 and 43 engaging the inner sides of pins 44 and 45 connected to each of the wings 33 and 34. These pins are slidable transversely in slots 46 and 47 in plate 26. Normally the springs act to move the wings outwardly to increase the area of the head so as to maintain the free edges of the wings in contact with the converging side walls 11 of the box at all times, although permitting a decrease in area of the head when this is necessary during movement of the latter through the smaller end of the box. It will be noted that each of the wings has a slot 48 for receiving one of the pins 36 and 37 when the wings move inwardly toward the center of the head.

When a boned ham is deposited in the larger end of the box and the cover 12 is closed, turning of the crank 24 in a clockwire direction will cause movement of the head 21 through the box and through the smaller end thereof. When the ham is inserted, it is of irregular shape and similar to the shape of the ordinary ham except that it is boned and its movement through the box causes it to be extruded into a form substantially square in cross section corresponding to the shape of the smaller end of the box. Since the ham must be reduced in size to pass through the small end of the box, it necessarily must increase in length, and accordingly an extrusion of the ham results causing its elongation at the same time that it is reduced to an article of uniform cross section as defined by the smaller end of the box.

As this extruded ham emerges from the smaller end of the box it enters a tubular section 50 shown by Figs. 1, 2 and 3, which is aligned with the smaller end of the box and of substantially the same dimensions. This section is releasably fastened to the end of the box by any suitable fastening means such as opposite arms 51 on the section which are releasably secured in slots in projections 52 on the ends of the box, by removable keys 53. When the section 50 is in the latched position, it in effect constitutes a continuation of the smaller end of the box since it is of substantially the same cross-sectional dimensions. For receiving the extruded ham after it leaves the open end of tubular section 50, a wire basket 54 is provided which comprises two sections 55 and 56 of angular character that are pivoted together at one corner as indicated at 57 and releasably fastened together at the other and diagonally opposite corner by a removable wire or rod 58. This basket is constructed of peripherally spaced, longitudinally extending wires 59 that are fastened together at intervals by peripherally extending wires 60. The basket telescopes over the section 50 and as shown best by Fig. 1, may be releasably held in its telescoping position by a spring pressed latch 61 that engages the end, peripherally extending wire 60 at the right end of the basket. The projection of the section 50 a considerable distance into the basket insures the passing of the extruded ham initially to a point near the left end of the basket and thus avoids movement of the ham past an undesirable number of the peripherally extending wires 60 which would impede its progress. It has been found that it is not necessary to have the tubular section extending entirely to the left end of the basket but that it should extend to a point near this end of the basket. This left end of the basket is closed by a wire end wall 62 which will be described hereinafter more in detail, and as the ham extrudes from the section 50 it engages the end wall and after some compacting occurs, the latch 61 is released allowing the basket to move away from the box along with the extrusion of the ham. Finally the head 21 is moved entirely through the tubular section 50, thus completely depositing the ham in the basket but it may be noted at this time that even then the basket may still partially telescope over the tubular section 50. The length of the extruded ham, of course, may vary depending upon the size of the ham inserted into the box before the extrusion process, but the section thereof will be substantially uniform and square in shape as defined by the end of the box and tubular section.

As best shown by Fig. 10, the end wall 62 is of open mesh wire construction and two transverse wires 63 are fastened thereto which project beyond opposed sides of the end wall and terminate in arcuate lips 64. This end wall may be inserted into the left end of the basket by tilting it and moving the upper projections into the end of the basket and then upwardly between the wires 59 next to the second of the peripheral wires 60. Then, owing to the inclination of the end wall and the space between the two end wires 60, the end wall may be reverted to its normal position during which the lower projections 63 move inwardly past the end wire 60 and down between the wires 59. Then the basket has projections 63 at opposed sides extending outwardly between the wires 59 and between the two peripheral wires 60 at the end of the basket. Engagement of these projections with the end wire prevents removal thereof except in the tilting manner stated. The basket with the end wall 62 at the left end thereof is used in the extrusion process as already described.

After the ham has been extruded into the basket and the latter is removed, a second end wall 62 is disposed in the basket at the right end thereof and preferably the end wire 60 at the right end of the basket will have openings as indicated at 65 for permitting passage of the projections 63 therethrough. As now positioned, the two end walls are movable toward each other until they engage the peripheral wires 60 inwardly and next to them. For connecting the end walls and applying resilient pressure thereto and against the ends of the ham, loops 66 and 67 are provided for engaging the arcuate lips 64 of the projections 63 at opposite sides of the basket, and such loops are connected by tensioned springs 68. Thus, at opposite sides of the basket, tensioned springs are drawn against the end walls and this resilient pressure is applied to the ends of the ham. It has been found very desirable in baking the ham in the basket described, to apply this resilient pressure to the end walls as pressure maintains the shape of the ends of the ham and promotes a desirable texture of ham during baking. The sides of the basket of course maintain the shape of the ham during baking. Additionally, it might be noted that during baking, some shrinkage of the ham occurs and the resilient pressure applied to the end walls takes up this shrinkage and even tends to slightly expand the ham against the side walls of the basket for maintaining the ham in proper shape. After the baking operation in which the ham is disposed in the basket, the spring devices are removed, along with the end walls, and then the wire or rod 58 is removed from the corner of the basket thus permitting separation of the two sections 55 and 56 in a direction laterally of the ham. The end walls, of course, might remain in position after removal of the springs and then be separated from the basket during separation of the sections 55 and 56. It may be stated that in the event smaller hams are being manufactured, the outer end wall 62 might be disposed between the second and third peripheral wires 60, if this is found desirable. Also a block indicated at 70 may be disposed in the right end of the basket in front of one end wall to compensate for shorter hams.

The product finally obtained is similar in appearance to that shown by Fig. 11 and is of substantially uniform cross section although it may vary in length depending upon the size of the ham processed. Use of the wire basket enables obtaining a truly baked ham as the open wire mesh construction of the basket permits the evaporation of moisture and avoids trapping thereof and cooking or boiling of the ham instead of baking. Application of the resilient pressure to the ends of the ham is desirable to not only maintain the form and compensate for shrinkage during baking, but also for improving the texture of the ham. The product obtained is thus uniform in cross section although variable in length, and is of truly baked character as distinguished from an irregular ham that has been baked by tying strings around it. Actual use of the apparatus and process has revealed that a much better baked ham may be obtained and that the article produced maintains its uniform cross-sectional dimensions and this is of considerable advantage to markets and the like where it is necessary to slice ham in selling it.

In Figs. 12 and 13, a container attachment 72 is illustrated which is adapted particularly for making boiled ham. This container is composed of metal and is closed at one end and open at its other. The open end is adapted to be telescoped over the tubular section 50 and latched in position by teeth 73 cooperating with the latch 61. It will be noted that these teeth are provided on opposite sides of the container. The ham is extruded into the container in the same way as previously described in connection with the basket, and to allow air to escape in the closed end of the container, air vents 74 may be formed in the corner portions of the end wall. After the ham is in the container, the latter is removed from the tube 50.

To obtain pressure on the ham while it is in the oven or is being heated, a head 75 is inserted in the open end of the container, and this head has a pin 76 which slidably projects through a cross bar 77 and is provided with a nut 78 on its outer end. A spring 79 encircles the pin between the head 75 and cross bar 77 and resiliently urges the head against the ham. Opposite ends of the bar 77 have pivoted arms 80 provided with latch portions 81 adapted to selectively engage the teeth 73. It will be evident that the head 75 may be disposed against the ham and the bar 77 moved to compress the spring and then latched in position. This loading of the spring insures a constant pressure on the ham during boiling so as to provide better texture, uniform dimensions, etc. It is evident that the moisture in the ham will be prevented from escaping, so that the ham will become boiled by the heat of its own moisture.

Although only one form of the invention has been illustrated and described in detail, it will be appreciated by those skilled in the art that various modifications may be made without departing from the scope of the appended claims.

What I claim is:

1. The process of manufacturing ham which comprises simultaneously reducing the cross-sectional area and extruding a boned ham to form an elongated article substantially uniform in cross-sectional shape, disposing the article as it is extruded into an elongated container while maintaining the form of the article, and cooking the article while in said container.

2. The process of manufacturing ham which comprises simultaneously reducing the cross-sectional area and extruding a boned ham to form an elongated article substantially uniform in cross-sectional shape, disposing the article as it is extruded into an elongated container and enclosing it therein while maintaining the form of the article while in said container.

3. The process of manufacturing baked ham which comprises simultaneously reducing the cross-sectional area and extruding boned ham to form an elongated article substantially uniform in cross-sectional shape, disposing the article in an elongated open mesh basket of corresponding shape while maintaining the form of the article, applying pressure to the ends of the article, and simultaneously baking it and then removing the basket.

4. The process of manufacturing baked ham which comprises shaping a ham by extruding the ham through a confining space to reduce its cross-sectional area forming an elongated article substantially uniform in cross-sectional shape, and simultaneously disposing the article in an elongated open mesh basket of corresponding shape while maintaining the form of the article, applying pressure to the ends of the article, and simultaneously baking it, and then removing the basket.

5. The process of manufacturing baked ham comprising reducing the cross-sectional area of a boned ham in a direction transverse to its longitudinal axis by extruding said ham through a confining space to form an article of uniform cross-sectional shape, simultaneously directing the article into an open mesh basket, maintaining a lateral pressure and applying a constant longitudinal pressure on said article in the basket and simultaneously baking it, and then removing the basket.

WILL W. HUBENET.